(12) United States Patent
Marko (10) Patent No.: US 7,136,640 B2
(45) Date of Patent: *Nov. 14, 2006

(54) METHOD AND APPARATUS FOR SELECTIVELY OPERATING SATELLITES IN TUNDRA ORBITS

(75) Inventor: Paul D. Marko, Pembroke Pines, FL (US)

(73) Assignee: XM Satellite Radio Inc., Washington, DC (US)

( * ) Notice: Subject to any disclaimer, the term of this patent is extended or adjusted under 35 U.S.C. 154(b) by 598 days.

This patent is subject to a terminal disclaimer.

(21) Appl. No.: 10/171,619

(22) Filed: Jun. 13, 2002

(65) Prior Publication Data

US 2002/0151273 A1 Oct. 17, 2002

Related U.S. Application Data

(63) Continuation of application No. 09/433,849, filed on Nov. 4, 1999, now Pat. No. 6,442,385.

(51) Int. Cl.
  *H04Q 7/20* (2006.01)
(52) U.S. Cl. .................. 455/428; 455/427; 455/430; 455/431; 455/3.01; 455/3.02; 455/403; 455/12.1
(58) Field of Classification Search .............. 455/427, 455/428, 430, 431, 3.01, 3.02, 12.1, 13.1, 455/422.1, 403, 500, 517; 375/316, 260
  See application file for complete search history.

(56) References Cited

U.S. PATENT DOCUMENTS

| 4,943,808 | A | 7/1990 | Dulck et al. .......... 342/356 |
| 5,278,863 | A | 1/1994 | Briskman ............... 375/130 |
| 5,319,673 | A | 6/1994 | Briskman ............... 455/13.1 |
| 5,485,485 | A | 1/1996 | Briskman et al. ...... 455/13.2 |
| 5,553,816 | A | 9/1996 | Perrotta ................. 244/158.4 |
| 5,582,367 | A | 12/1996 | Castiel et al. .......... 244/158.4 |
| 5,592,471 | A | 1/1997 | Briskman ............... 455/13.2 |
| 5,669,585 | A | 9/1997 | Castiel et al. .......... 244/158.4 |
| 5,678,174 | A | 10/1997 | Tayloe .................... 455/13.1 |
| 5,720,039 | A | 2/1998 | Lieberman .............. 455/10 |
| 5,745,839 | A | 4/1998 | Lieberman .............. 455/10 |
| 5,788,187 | A | 8/1998 | Castiel et al. .......... 244/158.4 |
| 5,794,138 | A | 8/1998 | Briskman ............... 455/344 |
| 5,845,206 | A | 12/1998 | Castiel et al. .......... 455/13.4 |
| 5,864,579 | A | 1/1999 | Briskman ............... 455/13.4 |
| 5,931,417 | A | 8/1999 | Castiel et al. .......... 244/158.4 |
| 6,102,335 | A | 8/2000 | Castiel et al. .......... 244/158.4 |
| 6,442,385 | B1 * | 8/2002 | Marko .................... 455/427 |

FOREIGN PATENT DOCUMENTS

| EP | 0 959 573 | 11/1999 |
| EP | 0959573 | 11/1999 |
| GB | 2 313 743 | 12/1997 |

(Continued)

OTHER PUBLICATIONS

FCC Application of Satellite CD Radio, Inc. to Modify Authorization, Dec. 11, 1998, pp. 1-12 and A1-A33.

(Continued)

*Primary Examiner*—Keith Ferguson
(74) *Attorney, Agent, or Firm*—Roylance,Abrams,Berch & Goodman, L.L.P.

(57) ABSTRACT

A satellite system provides geosynchronous satellites in tundra orbits in respective elliptical orbital planes separated by 120 degrees. The satellites traverse a common figure-eight ground track comprising northern and southern loops. The satellites are controllably switched to operate the satellite currently traversing the northern loop to deliver a selected signal (e.g., a selected frequency signal) to satellite receivers.

15 Claims, 7 Drawing Sheets

FOREIGN PATENT DOCUMENTS

GB    2 326 285    12/1998

OTHER PUBLICATIONS

G. Solari et al., "M-HEO: The Optimal Satellite System for the Most Highly-Populated Regions of the Northern Hemisphere", System Studies Division, ESTEC, Noordwijk, The Netherlands, 2521 ESA Bulletin, (May 1992), No. 70, pp. 80-88.

G. Berretta, "The Place of Highly Elliptical Orbit Satellites in Future Systems" IEE Colloquium on Highly Elliptical Orbit Satellite Systems, IEE, London, GB, May 29, 1989, XP-002102316, pp. 1-4.

C. J. Ashton, "Archimedes—Land Mobile Communications From Highly Inclined Satellite Orbits", International Conference on Satellite Systems for Mobile Communications and Navigation, Oct. 17, 1988, pp. 133-137.

* cited by examiner

METHOD AND APPARATUS FOR SELECTIVELY OPERATING SATELLITES IN TUNDRA ORBITS

This application is a continuation of U.S. patent application Ser. No. 09/433,849, filed Nov. 4, 1999, now U.S. Pat. No. 6,442,385 B1.

FIELD OF THE INVENTION

The invention relates to a method and apparatus for selectively operating tundra orbit satellites in a satellite broadcast system.

BACKGROUND OF THE INVENTION

Radio frequency transmissions are often subjected to multipath fading. Signal blockages at receivers can occur due to physical obstructions between a transmitter and the receiver or service outages. For example, mobile receivers encounter physical obstructions when they pass through tunnels or travel near buildings or trees that impede line of sight (LOS) signal reception. Service outages can occur, on the other hand, when noise or cancellations of multipath signal reflections are sufficiently high with respect to the desired signal.

Communication systems can incorporate two or more transmission channels for transmitting the same program or data to mitigate the undesirable effects of fading or multipath. For example, a time diversity communication system delays the transmission of program material on one transmission channel by a selected time interval with respect to the transmission of the same program material on a second transmission channel. The duration of the time interval is determined by the duration of the service outage to be avoided. The non-delayed channel is delayed at the receiver so that the two channels can be combined, or the program material in the two channels selected, via suitable receiver circuitry. One such time diversity system is a digital broadcast system (DBS) employing two satellite transmission channels.

Figure 1:
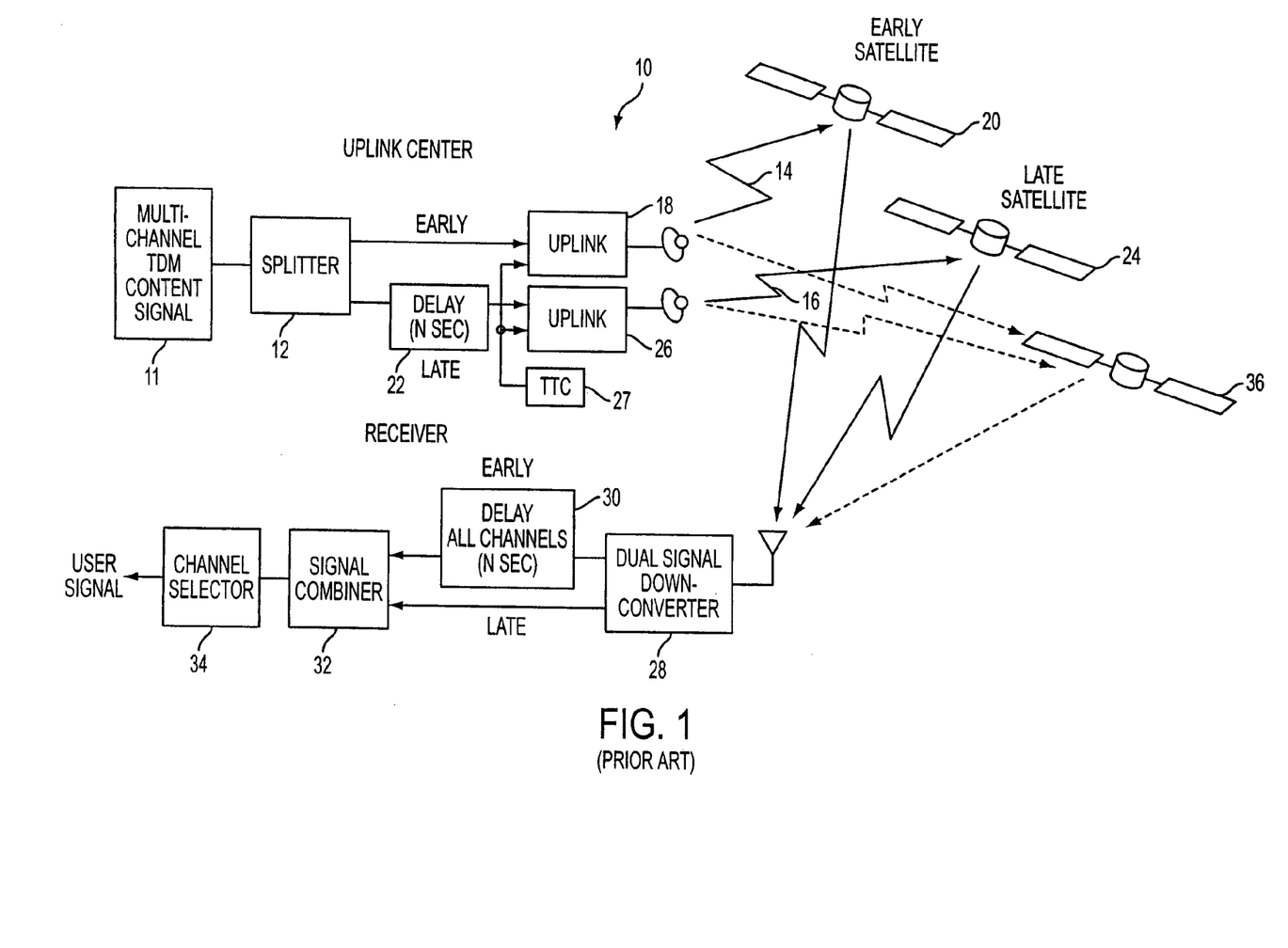
FIG. 1 is a block diagram of a conventional time diversity satellite broadcast system.

With reference to FIG. 1, a DBS 10 with time diversity is shown. An uplink facility comprises a splitter 12 for providing multiple channel time division multiplexed (TDM) content 11 to each of two transmission channels 14 and 16. The first transmission channel 14 is transmitted to a first satellite 20 at a first frequency f1 via uplink components indicated at 18. The second transmission channel 16 is delayed by a selected time interval, as indicated at 22, prior to being transmitted to a second satellite 24 at a second frequency f2 via uplink components indicated at 26. A dual arm receiver receives the early and late signals from the satellites 20 and 24, respectively, at a downconverter 28. A delay unit 30 delays the early signal from the satellite 20 via a time interval corresponding to the time interval used to delay the second transmission channel at the transmitter. The delay is applied to all of the channels in the multiple channel TDM content 11. The delayed output from the delay unit 30 can then be synchronized with the late signal and combined, as indicated at 32. A channel selector 34 extracts content corresponding to a particular one of the channels in the multiple channel TDM content in response to a user input, for example.

Figure 2:
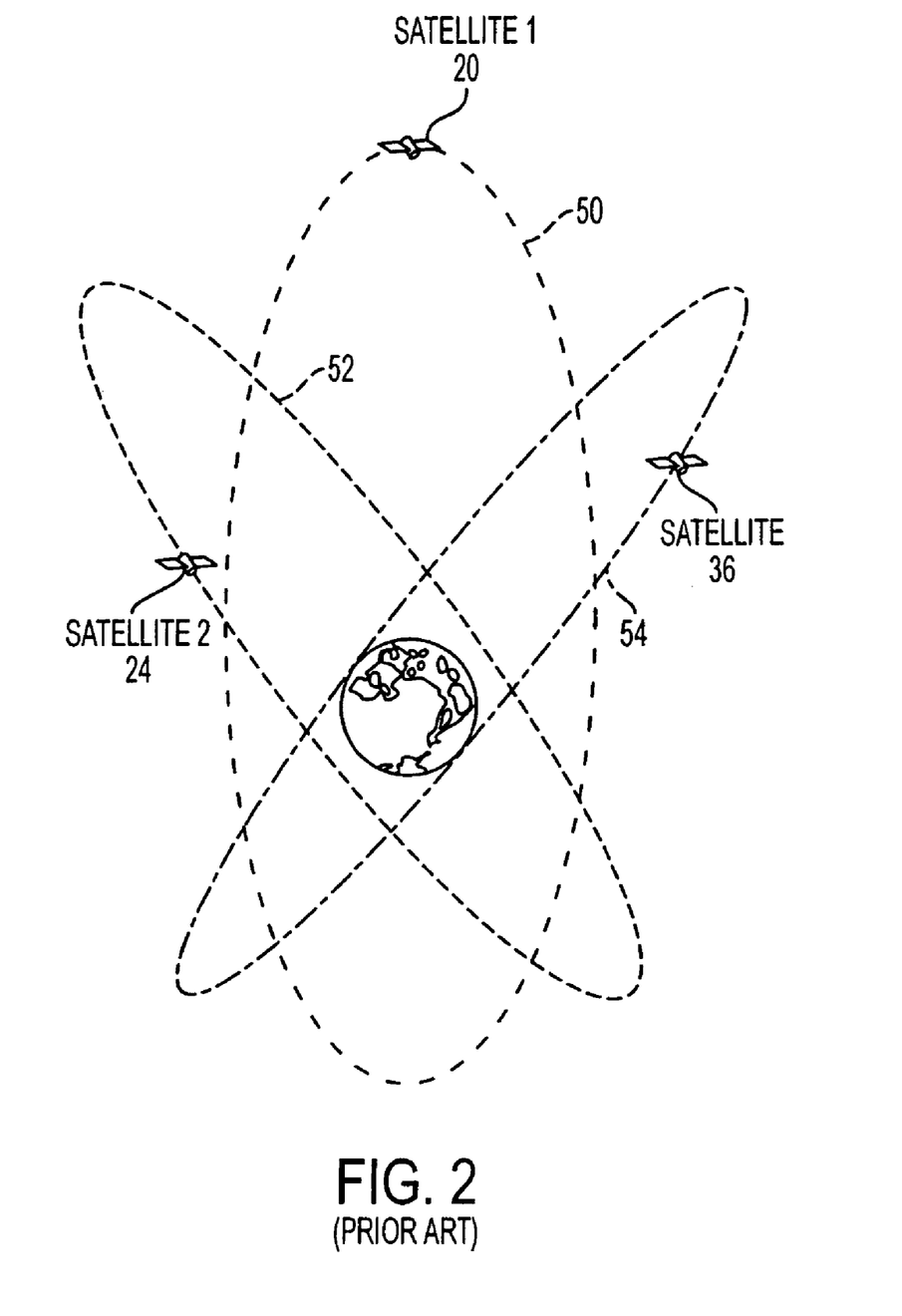
FIG. 2 illustrates orbital elements of a satellite constellation.
Figure 3:
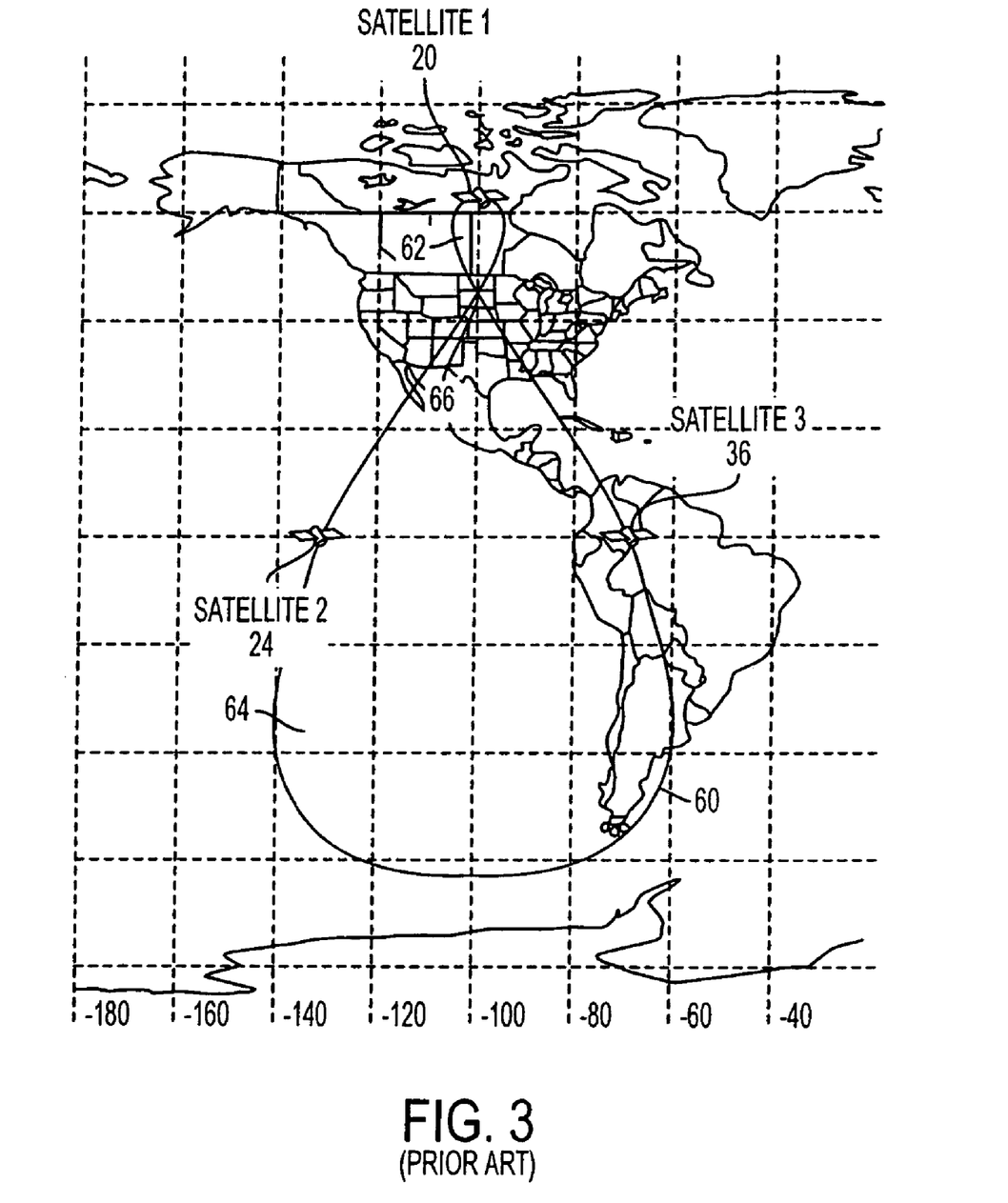
FIG. 3 illustrates a ground track corresponding to satellites in a tundra orbit and with respect to an exemplary geographic region.

In a particular implementation of a DBS with time diversity, three satellites 20, 24 and 36 operate in respective ones of tundra orbits 50, 52 and 54, as illustrated in FIG. 2. In other words, the satellites 20, 24 and 36 are in respective ones of three inclined, elliptical orbits which are each separated by approximately 120 degrees. The combination of the 120 degree separation and the rotation of the earth yields a common ground track 60 for all three orbits which is illustrated in FIG. 3. In addition to an approximately 120 degree spatial separation, the orbits 50, 52 and 54 are temporally separated by T/3 or one-third of an orbit period T (e.g., one-third or eight hours of a 24 hour geosynchronous orbit).

Figure 4:
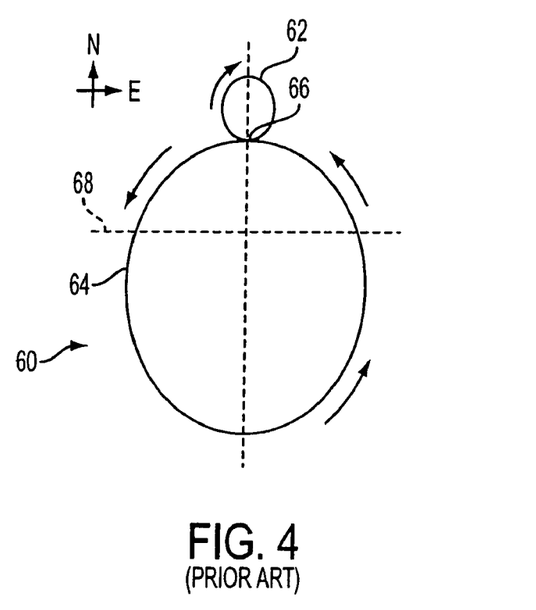
FIG. 4 illustrates components of an exemplary ground track for a satellite in a tundra orbit.
Figure 5:
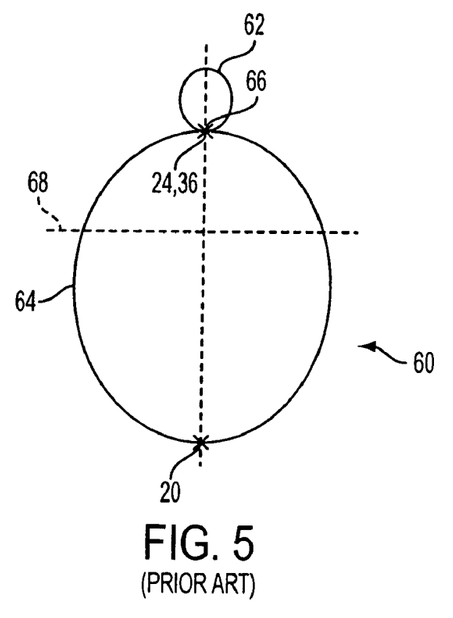
FIG. 5 illustrates a crossover situation for satellites in tundra orbits with a common ground track.

With continued reference to FIG. 3, the satellite ground track 60 is a figure-eight, having a northern loop 62 that is smaller than the southern loop 64. The northern and southern loops 62 and 64 share a common ground track point hereinafter referred to as the crossover point 66, as shown in FIG. 4. At the crossover point, satellites descending from the northern loop 62 to the southern loop 64 have the same orbital position as satellites ascending from the southern loop 64 to the northern loop 62. Each satellite 20, 24 and 36 spends approximately one-third (e.g., eight hours) of its orbit time south of the equator 68 and, correspondingly, two-thirds (e.g., sixteen hours) of its orbit time north of the equator. Thus, when one satellite 20 is at perigee, as shown in FIG. 5, the subsatellite points of the other two satellites 24 and 36 cross paths and are therefore in the same sky position at the crossover point 66.

Figure 6:
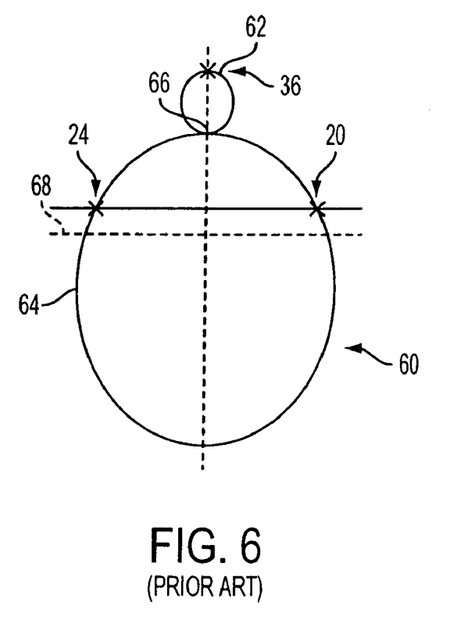
FIG. 6 illustrates a switchover situation for satellites in tundra orbits with a common ground track.

As indicated in FIG. 6, when one satellite 36 is at apogee, the other two satellites 20 and 24 are at essentially equal latitude near the equator 68. Of these two satellites, (e.g., satellites 20 and 24 in FIG. 6), one satellite 20 appears to be rising in the southeast, while the other satellite 24 appears to be setting in the southwest. The rising satellite commences transmitting, while the setting satellite ceases transmitting to comply with international coordination and interference concerns with respect to the allocation of bandwidth for satellite operations. By symmetry of the elliptical orbit, this situation of two satellites at nearly the same latitude occurs halfway through an orbit following the time of perigee, that is, at time T/2 (e.g., 24/2 or 12 hours) past perigee.

In a time diversity system as described above in connection with FIG. 1, the satellites 20, 24 and 36 operate as either the "early" satellite (i.e., the satellite transmitting the non-delayed channel 14) or the "late" satellite (i.e., the satellite transmitting the delayed channel 16), depending on the position of the satellite along the satellite ground track 60. For example, when the satellites 20, 24 and 36 are located along the ground track 60 as depicted in FIG. 6, the satellite 20 is the late satellite for illustrative purposes and is switched on shortly after it ascends past the equator along the southern loop 64. Correspondingly, the satellite 24 is switched off for its travel along the portion of the southern loop 64 that is below the equator 68. The satellite 36 is the early satellite.

When each satellite commences its ascent north of the equator along the southern loop 64, the satellite is switched from "early" to "late", or "late" to "early", depending on its "early" or "late" status during its traverse of the previous northern loop 62. Thus, the "early" or "late" status of a satellite changes in an alternate manner after the completion of the period during which the satellite is switched off, that is, while traversing the southern loop 64 when the orbital position of the satellite is at a latitude below the equator 68. Accordingly, in the previous example, when the late satellite 36 reaches a latitude near the equator while descending in the southern loop 64, the early satellite 20 is at apogee, and the satellite 24 is switched on and is commencing its ascent above the equator, approximately eight hours later. The satellite 36 is therefore switched off and the satellite 24 is the late satellite. The uplink components 18 and 26 are each controlled using data from a telemetry, tracking and command (TTC) system 27 which monitors and controls the flight operations of the satellites 20, 24 and 36, as shown in FIG. 1. In accordance with this TTC system data, the uplink components 18 and 26 are commanded to transmit the content on the transmission channels 14 and 16, respectively, to the selected ones of the satellites, depending on their orbital positions and corresponding positions along the ground track 60. Each satellite is capable of receiving either of the frequencies corresponding to the late or early satellite signals as commanded by the TTC system.

In view of the above-described system for operating early and late satellites in tundra orbits, a compromise exists between the elevation angle and the availability of spatial and/or time diversity. When elevation angles to one or two satellites are greatest, at least one method of diversity is less available. This tradeoff situation is presented every T/3 or eight hours where T is a 24 hours orbit period. For example, in the crossover situation depicted in FIG. 5, one satellite 20 is at perigee and is not visible from locations in the United States. The other two satellites 24 and 36 are in essentially the same position in the sky. No spatial diversity is available at such orbital positions for approximately one hour, although time diversity is available. In the switchover situation depicted in FIG. 6, two satellites have nearly the same elevation angle, but different azimuths. The elevation angle for these rising and setting satellites 20 and 24, respectively, is nearly as small as the minimum elevation angle for any satellite visible at that location during the orbit period. The elevation angle of the third satellite 36, however, is the greatest elevation angle for that United States location. Since the setting and rising satellites 24 and 20 are relatively low with respect to the horizon, the rising satellite that is switched on is likely to be obscured by terrestrial obstruction. Thus, a reduced availability of spatial and time diversity exists at such times. This situation exists for approximately one hour and occurs approximately every eight hours. For places in the eastern United States, this situation begins prior to the switchover described with reference to FIG. 6, whereas the situation commences after switchover for places in the western United States.

The tradeoff situations described above emphasize the importance of time diversity. The receiver, as stated previously, stores all of the channels in the multi-channel TDM content signal 11 for a selected period of time. Thus, if both of the satellites are obstructed momentarily, the signal 11 can be recovered from the delayed portion of early received signal. Additionally, since the output of the signal combiner 32 contains the combined early and late signals from all of the channels, the user may change the channel selector 34 and immediately receive the new channel contents from the combined TDM signal. Such storage, however, requires significant memory which increases the cost of the receiver. A need therefore exists for a satellite broadcast system which reduces the memory requirements of the receiver in a time diversity satellite broadcast system. A need also exists for a satellite broadcast system that selectively switches signals transmitted from satellites in selected tundra orbit positions to improve reception of the signals (e.g., by increasing elevation angle).

SUMMARY OF THE INVENTION

In accordance with the present invention, satellites in a satellite broadcast system are operated in separate tundra orbits and follow a common figure-eight ground track having northern and southern loops connected via a crossover point, that is, each satellite traverses the crossover point when in orbital positions corresponding to the descent of the satellite from the northern loop to the southern loop and to the ascent of the satellite from the southern loop to the northern loop. The satellites are selectively switched based on their position with respect to the ground track. For example, the satellites are selectively switched at or near the crossover point such that when each satellite is in an orbital position corresponding to a point along the northern loop, the satellite provides a late satellite signal. Each satellite is switched from late to early satellite operation mode when in orbital positions that are both above the equator and correspond to the southern loop of the ground track. Alternatively, the satellites are selectively switched to improve reception of a signal of a particular frequency (e.g., to transmit a selected frequency signal from whichever satellite is traversing the northern loop).

In accordance with another aspect of the present invention, at least three satellites are each operated in tundra orbits which traverse a common figure-eight ground track comprising northern and southern loops. The satellites are in three orbital planes spaced essentially evenly about the earth (e.g., approximately 120 degrees apart), resulting in an eight hour orbital position separation.

BRIEF DESCRIPTION OF THE DRAWINGS

The various aspects, advantages and novel features of the present invention will be more readily comprehended from the following detailed description when read in conjunction with the appended drawings, in which.

Throughout the drawing figures, like reference numerals will be understood to refer to like parts and components.

DETAILED DESCRIPTION OF THE PREFERRED EMBODIMENTS

Figure 7:
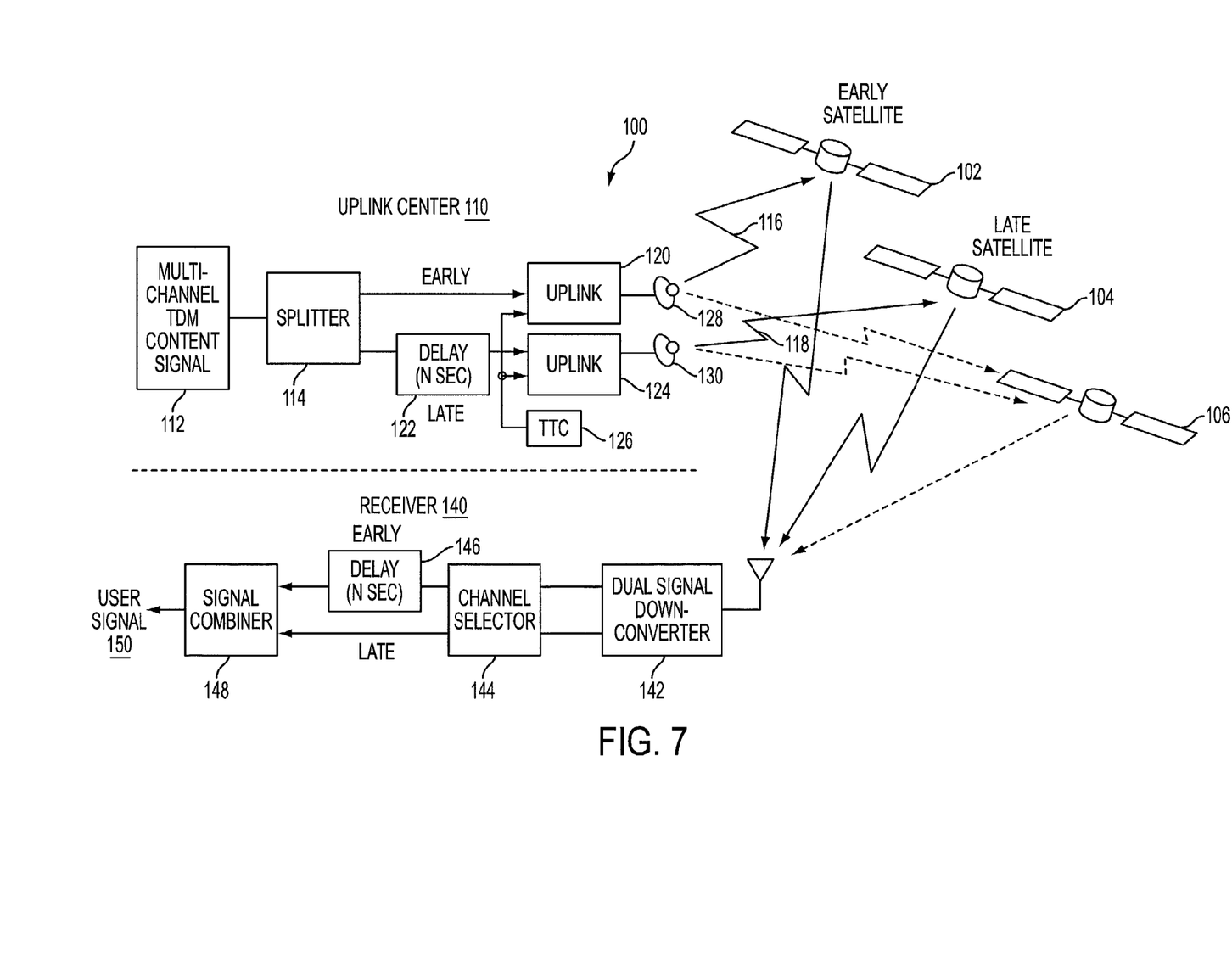
FIG. 7 is a block diagram of a time diversity satellite broadcast system constructed in accordance with an embodiment of the present invention.

With reference to FIG. 7, a time diversity satellite broadcast system 100 is provided having at least three satellites 102, 104 and 106 in a non-geostationary constellation. Each satellite 102, 104 and 106 is preferably placed in a tundra orbit whereby each satellite is in an elliptical orbit inclined 63.4 degrees relative to the equator. Each satellite 102, 104 and 106 is preferably geosynchronous with a nominal 24-hour period. In addition, the three orbit planes for the satellites 102, 104 and 106 are spaced evenly about the earth by approximately 120 degree increments, as illustrated by satellites 20, 24 and 36 in FIG. 2, resulting in approximately an eight hour orbital position separation. In accordance with the present invention, two of the three satellites 102, 104 and 106 are selectively operated in early and late satellite service modes to transmit to, for example, the 48 contiguous United States coverage area at any time.

Figure 8:
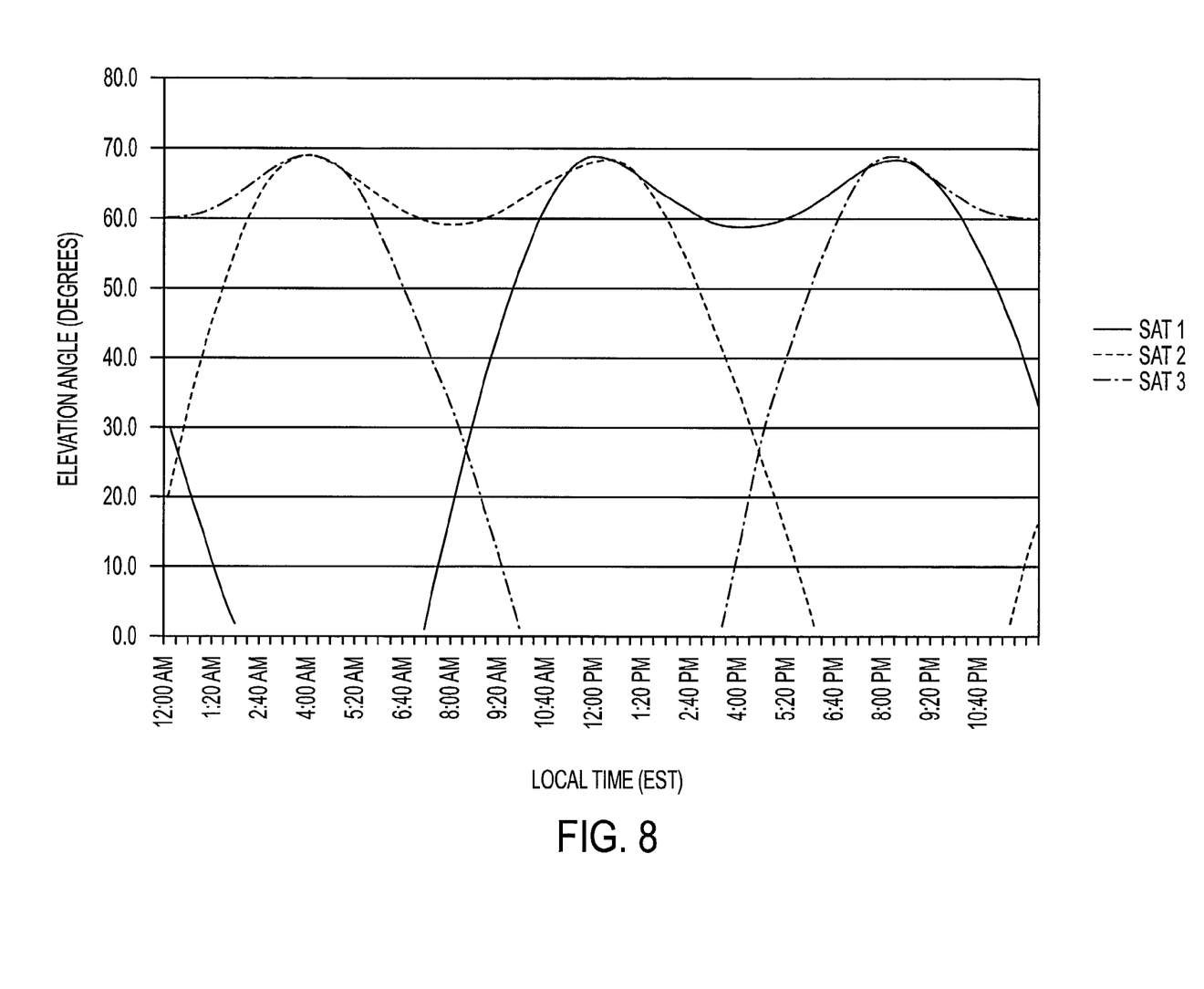
FIG. 8 is a graph illustrating elevation angles for satellites in tundra orbits with respect to each other.

The satellites 102, 104 and 106 follow a common ground track such as the ground track 60 illustrated in FIG. 3. As stated above, satellite ground track 60 is a figure-eight, having a northern loop 62 that is smaller than the southern loop 64. The northern and southern loops 62 and 64 share a crossover point 66, as shown in FIG. 4. Each satellite 102, 104 and 106 spends approximately one-third (e.g., eight hours) of its orbit time south of the equator 68. Each satellite is preferably switched off during this time period. Each satellite spends two-thirds (e.g., sixteen hours) of its orbit time north of the equator 68. In addition, each satellite spends eight of those sixteen hours in the smaller northern loop 62. In addition, the orbital positions of a satellite that correspond to the northern loop 62 of the ground track 60 provide the highest elevation angles when compared to orbital positions corresponding to the southern loop 64. As shown in FIG. 8, the satellites 102, 104 and 106 achieve maximum elevation angles for respective eight hour periods in each 24-hour orbital period. The present invention takes advantage of these eight hour periods of improved elevation angles by switching the satellite 102, 104 or 106 that is entering the northern loop of its ground track to late satellite operation. Correspondingly, the satellite that is in the southern loop 64 of the ground track 60 and is above the equator is operated as the early satellite.

With continued reference to FIG. 7, a transmitter or uplink center 110 in the system 100 provides a signal such as a multi-channel TDM content signal 112 to a splitter 114. The splitter 114, in turn, provides the signal to each of two transmission channels 116 and 118. The first transmission channel 116 is transmitted at a first frequency f1 via an uplink component indicated at 120. The second transmission channel 118 is delayed by a selected time interval, as indicated at 122, prior to being transmitted to a second satellite at a second frequency f2 via an uplink component indicated at 124. A TTC unit 126 is provided which tracks the flight operations of the satellites 102, 104 and 106. Data from the TTC unit 126 is used to direct the dish 128 associated with the uplink component 120 and the dish 130 associated with the uplink component 124 to the satellite traversing the southern loop 64 (i.e., when the satellite is above the equator) and the satellite traversing the northern loop 62, respectively, of the ground track 60.

Figure 9:
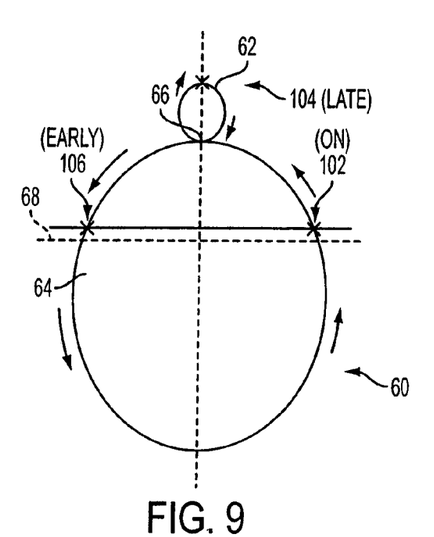
FIGS. 9, 10, 11 and 12 illustrate ground track positions of three satellites at different times during an orbital period and their selection as early and late satellites in a time diversity system in accordance with an embodiment of the present invention.

The satellites are depicted in exemplary ground track positions in FIGS. 9, 10, 11 and 12 for illustrative purposes. In FIG. 9, the satellite 102 is ascending the southern loop 64 from the equator 68 and is powered on. The satellite 104 is at apogee and operated as the late satellite in accordance with the present invention. The satellite 106 is descending the southern loop 64 below the equator 68 and is therefore being powered down. Prior to reaching an orbital position near the equator, the satellite 106 is operated as the early satellite in accordance with the present invention.

Figure 10:
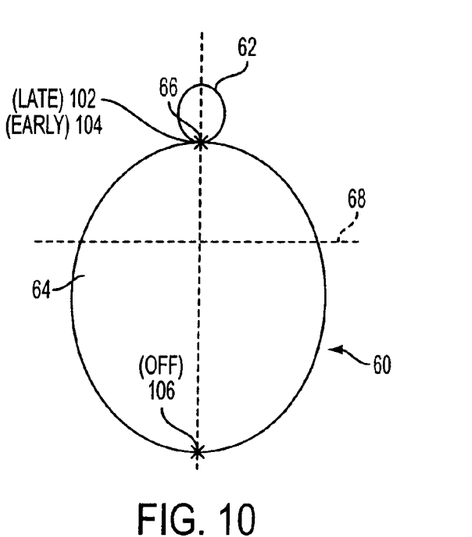

FIG. 10 depicts the ground track positions of the satellites 102, 104 and 106 in the illustrated example after four hours of the 24-hour orbital period have elapsed since the positions depicted in FIG. 9. Once the satellite 102 reaches the crossover point 66, the uplink component 124 is commanded using data from the TTC unit 126 to re-point its beam from the satellite 104, which has now also reached the crossover point 66, to the satellite 102 to operate the satellite 102 as the late satellite while it traverses the northern loop 62. Correspondingly, the uplink component 120 is commanded to re-point its beam from the satellite 102 to the satellite 104 to switch its operation from late to early satellite operation.

Figure 11:
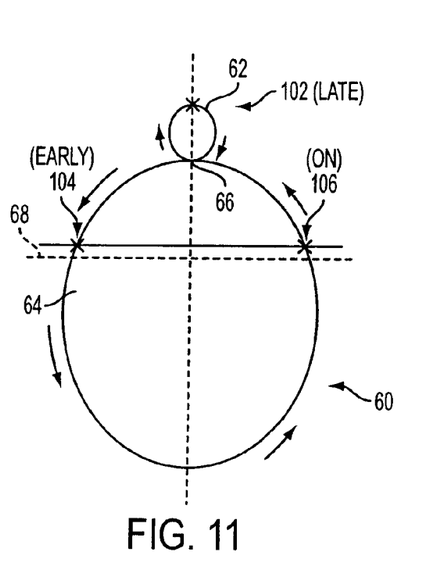

FIG. 11 depicts the ground track positions of the satellites 102, 104 and 106 in the illustrated example after another four hours (i.e., a total of eight hours) of the 24-hour orbital period have elapsed since the positions depicted in FIG. 9. The satellite 106 is powered on when it commences its ascent of the southern loop 64 above the equator 68. The early satellite 104 is powered down below the equator 68. The satellite 102 continues to operate as the late satellite which provides better elevation angles than the other two satellites.

Figure 12:
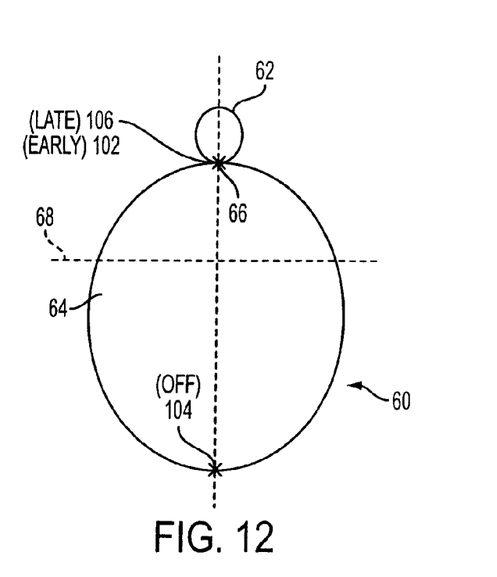

FIG. 12 depicts the ground track positions of the satellites 102, 104 and 106 in the illustrated example after another four hours (i.e., a total of twelve hours) of the 24-hour orbital period have elapsed since the positions depicted in FIG. 9. The uplink components 120 and 124 are commanded using data from the TTC unit 126 to re-point their beams to satellites 102 and 106 to operate the satellites 102 and 106 as the early and late satellites, respectively. As stated above, the satellite 104 is powered down at latitudes below the equator 68.

As can be seen from the illustrated example in FIGS. 9–12, the satellite traversing the northern loop 62 of the ground track 60 is operated as the late satellite for as many as eight hours until the next satellite commences the northern loop 62 of the ground track 60. When the satellites are in orbital positions corresponding to the northern loop 62, they have favorable elevation angles for minimizing the effects of line of sight obstructions, multipath fading and foliage attenuation of the received signal at the receiver 140 in FIG. 7.

In accordance with yet another aspect of the present invention, a satellite receiver tunes to the late satellite signal. Since the satellite that is in the orbital positions corresponding to the northern loop of the ground track is selected to be the late satellite, the satellite has improved elevation angles and is therefore less likely to be subjected to line of sight obstruction, multipath fading and foliage attenuation. Accordingly, the receiver can employ a relatively small buffer for storing the early satellite signal for a selected channel in the multi-channel TDM content signal for a predetermined period for combining purposes. This is in contrast with conventional receivers that store all channels in the early satellite signal for a selected period of time prior to channel selection, as indicated at 30 in FIG. 1.

As shown in FIG. 7, a dual arm receiver is tuned to receive the early and late signals from the early and late satellites, respectively. The received signals are downconverted by a downconverter 142. A channel selector 144 extracts a selected one of the channels in the received signals. The channel selector 144 can operate, for example, in response to a user input. The early signals for the selected channel are provided to a delay unit 146 which needs only be configured to store data from a single channel for a period of time corresponding to the delay imposed on the content 112 by the delay unit 122 in the transmitter 110. The late signals for the selected channel are provided to a signal combiner 148, along with the output of the delay unit 146, and then combined using one or more diversity combining methods to generate a user signal 150.

The need to store all channels at the receiver for a selected amount of time, as explained in connection with conventional receivers and FIG. 1, is eliminated by the switching operation of the late and early satellites described herein. Referring to FIG. 7, when a new channel is selected via the channel selector 144, the early signal is applied to the delay buffer 146 at the output of the channel selector, while the late signal is simultaneously applied to the signal combiner 148. Since it is unlikely that the late satellite signal is not received (i.e., since it is transmitted from a satellite at a high elevation angle), the output of the signal combiner immediately provides the new channel contents to the user based on the late signal availability. If the signal from the lower elevation early satellite was available at the output of the channel selector, it exits the delay block 146 and is available to the signal combiner 148 for combination with the late signal after the delay period has elapsed. The advantage of increasing the late signal availability is evident when considering the example of early satellite signal availability only. Under this condition with the receiver in FIG. 7, the early signal will not be available at the signal combiner 148 when a new channel is selected until after the early signal exits the delay block 146. This results in an interruption of service for the period of the delay block. In the system described in FIG. 1, all of the channels must be stored (e.g., as an early signal for a selected period of time) to overcome latency problems such as the interruption in service that can occur when the channel is changed, and the late channel is obstructed or severely faded. Such conditions have a high probability of occurring when the late satellite is transmitting from lower elevations along the lower loop 64.

Although the present invention has been described with reference to preferred embodiments thereof, it will be understood that the invention is not limited to the details thereof. Various modifications and substitutions have been suggested in the foregoing description, and others will occur to those of ordinary skill in the art. All such substitutions are intended to be embraced within the scope of the invention as defined in the appended claims.

What is claimed is:

1. A method for controlling first and second geosynchronous satellites in tundra orbits in respective orbital planes in a satellite communication system, the satellite communication system providing at least one of a first frequency signal and a second frequency signal to receivers, the satellites each traversing a common ground track having a northern loop, a southern loop, and a crossover point between the northern and southern loops, the method comprising the steps of:

selecting said first frequency satellite signal to be transmitted from whichever of said first and second geosynchronous satellites is traversing said northern loop;

monitoring when said first and second geosynchronous satellites enter said northern loop and exit said northern loop; and switching via a satellite command system said first frequency signal to one of said first and second geosynchronous satellites when said satellite enters said northern loop.

2. A method as claimed in claim 1, further comprising the step of switching via said satellite command system said second frequency signal to said satellite when said satellite exits said northern loop.

3. A method as claimed in claim 2, further comprising the step of powering down said satellite when said satellite descends said southern loop below the equator.

4. A method as claimed in claim 3, further comprising the step of powering on said satellite when said satellite ascends said southern loop from the equator.

5. A method as claimed in claim 4, further comprising the step of switching via said satellite command system said first frequency signal to said satellite when said satellite enters said northern loop.

6. A method for controlling first and second geosynchronous satellites in tundra orbits in respective orbital planes in a satellite communication system, the satellite communication system providing at least one of a first frequency signal and a second frequency signal to receivers, the satellites each traversing a common ground track having a northern loop, a southern loop, and a crossover point between the northern and southern loops, the method comprising the steps of:

selecting said first frequency satellite signal to be transmitted from whichever of said first and second geosynchronous satellites is traversing said northern loop;

monitoring the locations of said first and second geosynchronous satellites along said ground track; and switching via a satellite command system said first frequency signal to whichever of said first and second geosynchronous satellites is near said crossover point and one of entering said northern loop and traversing said northern loop.

7. A method as claimed in claim 6, further comprising the step of switching said second frequency signal to the other of said first and second geosynchronous satellites when said satellite is near said crossover point and one of approaching said crossover point to exit said northern loop and descending said southern loop.

8. A method for controlling first, second and third geosynchronous satellites in three inclined, elliptical orbits that are separated by approximately 120 degrees in a satellite communication system, the satellite communication system providing at least one of a first frequency signal and a second frequency signal to receivers, the satellites each traversing a common ground track having a northern loop, a southern loop, and a crossover point between the northern and southern loops, the method comprising the steps of:

powering on a first satellite that is ascending said southern loop from the equator;

operating a second satellite at apogee to transmit said first frequency signal to said receivers;

powering down a third satellite after descending said southern loop below the equator, said third satellite having operated to provide said second frequency signal to said receivers prior to reaching an orbital position near the equator;

operating said first satellite to transmit said first frequency signal when said first satellite reaches said crossover point and while said first satellite traverses said northern loop; and switching operation of said second satellite to transmit said second frequency signal when said second satellite traverses said crossover point to commence descent of said southern loop.

9. A method as claimed in claim 8, further comprising the steps of:

powering up said third satellite after ascending said southern loop from the equator; and switching operation of said third satellite to transmit said first frequency signal when said second satellite traverses said crossover point to commence ascent of said northern loop.

10. A method as claimed in claim 8, further comprising the step of powering down said second satellite when said second satellite traverses said southern loop below the equator.

11. A method for controlling first, second and third geosynchronous satellites in three inclined, elliptical orbits that are separated by approximately 120 degrees in a satellite communication system, the satellite communication system providing at least one of a first frequency signal and a second frequency signal to receivers, the satellites each traversing a common ground track having a northern loop, a southern loop, and a crossover point between the northern and southern loops, the method comprising the steps of:

powering on a first satellite that is ascending said southern loop from the equator;

operating a second satellite at apogee to transmit said first frequency signal to said receivers;

powering down a third satellite after descending said southern loop below the equator, said third satellite having operated to provide said second frequency signal to said receivers prior to reaching an orbital position near the equator;

switching said first satellite to said first frequency signal when said first satellite is near said crossover point; and switching operation of said second satellite to transmit said second frequency signal when said second satellite is near said crossover point and one of approaching said crossover point to exit said northern loop and descending said southern loop.

12. A method as claimed in claim 11, further comprising the steps of:

powering up said third satellite after ascending said southern loop from the equator; and switching operation of said third satellite to transmit said first frequency signal when said third satellite is near said crossover point and one of one of approaching said crossover point to enter said northern loop and ascending said southern loop.

13. A method as claimed in claim 11, further comprising the step of powering down said second satellite when said second satellite traverses said southern loop below the equator.

14. A satellite command system for use in a satellite communication system comprising first, second and third geosynchronous satellites in three inclined, elliptical orbits that are separated by approximately 120 degrees, the satellite traversing a common ground track having a northern loop, a southern loop, and a crossover point between the northern and southern loops, the satellite communication system comprising a first uplink device for transmitting a first frequency satellite signal and a second uplink device for transmitting a second frequency satellite signal, the satellite command system comprising:

at least one of an input device to receive data indicating the location of said satellites along said common ground path, and a device to determine and generate said data relating to the location of said satellites along said common ground path; and a processing device for generating commands depending on said data, said processing device being programmed to generate a first command to operate said first uplink device to transmit said first frequency satellite signal to whichever one of said satellites that is traversing said northern loop, and a second command to operate said second uplink device to transmit said second frequency satellite signal to whichever one of said satellites that is traversing said southern loop.

15. A satellite command system as claimed in claim 14, wherein said processing device is programmed to generate a command to power down whichever one of said satellites is traversing said southern loop below said equator.

* * * * *